Patented Mar. 2, 1943

2,312,480

UNITED STATES PATENT OFFICE 2,312,480

DERIVATIVES OF PREGNANE AND PREGNENE

Tadeus Reichstein, Zurich, Switzerland, assignor, by mesne assignments, to Roche-Organon, Inc., Nutley, N. J., a corporation of New Jersey No Drawing. Application March 10, 1938, Serial No. 195,161. In Switzerland March 22, 1937

14 Claims. (Cl. 260—397.4)

Compounds with a pregnane or pregnene skeleton (see Formula I) have either been isolated from natural sources or produced by oxydative decomposition from higher molecular substances. The production of such derivatives as are substituted in the carbon atom $C_{21}$ by a halogen or by oxygen e. g. a hydroxylgroup has not been described at all.

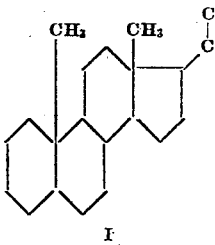

I

Now it was found that valuable derivatives of pregnane-3-ol-20-one differently substituted in the carbon atom $C_{21}$ can be prepared from 3-oxy-aetio-cholanic acid or the corresponding allo-cholanic or cholenic acids and particularly from saturated or unsaturated substituted derivatives of said acids bearing further oxygen atoms, as e. g. hydroxyl groups or in ether- or oxide-like bonds, by converting the starting materials in which the free hydroxyl groups in the ring-system have been protected (e. g. by acylation or alkoxylation) into the acid halides according to known methods and treating these acid halides likewise according to known methods (Cf. Arndt, Eistert, Partale, Ber. 60, 1364, 1927) with diazomethane. By varying the conditions of the reaction with diazomethane (Cf. Eistert, Ber. 69, 1074, 1936) the halogen derivatives of pregnane-ol-3-one-20 as well as the 21-diazo-derivatives can be obtained. The latter ones can be transformed in numerous ways. So e. g. the 21-diazo compounds eventually after alkaline saponification of acyloxyl groups present in the ring system may be converted into the 21-halogen compounds by treatment with hydrogen halides. Upon reaction of the 21-diazo ketones with oxygenous inorganic acids or with organic sulphonic acids derivatives with a free hydroxyl group at the carbon atom $C_{21}$ are obtained and finally upon reaction with organic carbonic acids the derivatives containing an acyloxyl group at the carbon atom $C_{21}$ are obtained.

Further in different stadia of the process free hydroxyl groups present can be alkoxylized with suitable alkyls which can be easily eliminated again. Also acyloxyl groups or suitable alkoxyl groups present in the ring system or in the side chain may be converted into hydroxyl groups by acid saponification.

By suitable combinations of the possibilities given, not only the important saturated as well as unsaturated polyoxy derivatives of pregnanolone can be prepared but also partially acylated or alkoxylized products are accessible in this way; it is possible to prepare derivatives with a free hydroxyl group in the side chain, one or more of the hydroxyl groups in the ring system being substituted as well as derivatives with a protected hydroxyl group in the side chain and one or more free hydroxyl-groups in the ring system.

Such acylated or partially acylated derivatives of pregnanolone can also be prepared from the 21-halogen derivatives, by heating those derivatives with salts of organic or weak inorganic acids.

In order to secure a clear understanding the process and some of the numerous variations will be formulated for a distinct simple case. As a starting material we choose 3-oxy-Δ5,6-aetiocholenic acid (Formula II). This acid or its derivatives acylated or alkoxylated in the hydroxyl group can be prepared e. g. from stigmasterol or cholesterol. It is to be understood that the following reactions are given by way of example only and that the invention is not limited thereto.

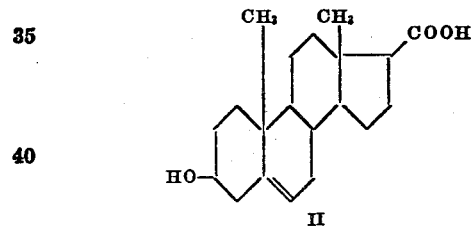

II

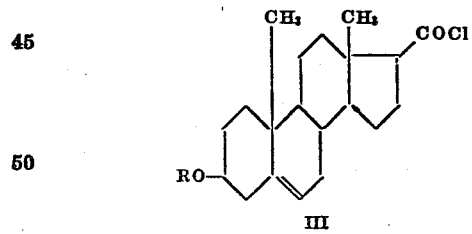

III

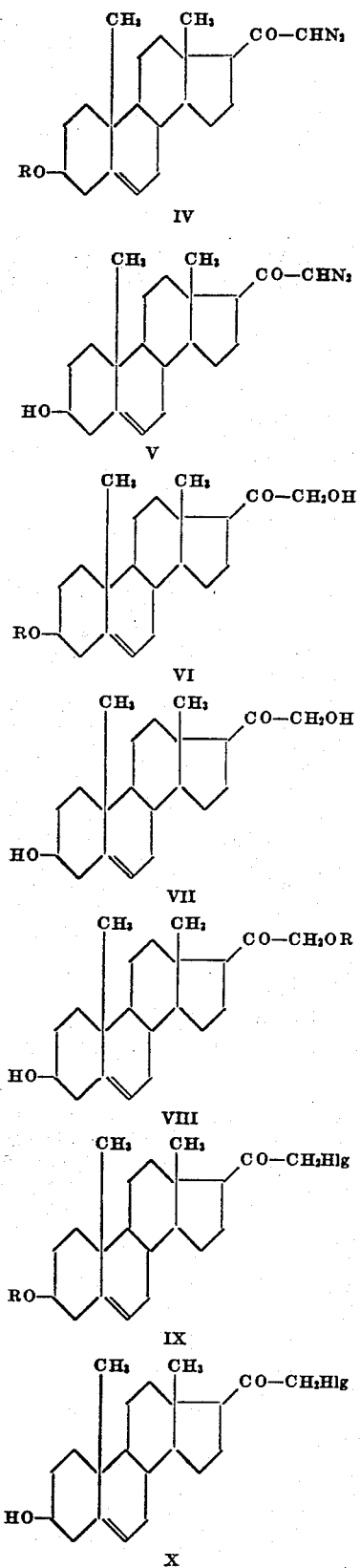

cess of diazomethane is used or whether this is added in successive portions to the acid halide. By careful alkaline hydrolysis the diazo ketone (IV) is converted into the free hydroxy-diazo ketone (V), provided the hydroxyl group has been acylated and not alkoxylated.

By treatment of the diazo ketone (IV) with an aqueous oxygenous inorganic acid, as e. g. sulfuric acid and phosphoric acids, or with organic sulphonic acids, e. g. toluene sulfonic acid, eventually adding suitable diluents, the derivative (VI) with a free hydroxyl group in the side chain and a protected one in the ring system is obtained. On the other hand treatment of the oxydiazo ketone (V) with organic acids appropriately in absence of water at temperatures ranging from about 60–120° C. leads to derivatives of the formula (VIII), in which the hydroxyl group in the ring system is free and the one in the side chain is acylated. Analogous derivatives, in which the 21-hydroxyl-group is alkoxylized, the one in the ring system being free, can be obtained from (VI) by alkoxylation, e. g. with triphenyl methylchloride and subsequent alkaline saponification. The derivative (VII) in which both hydroxyl groups are free can be prepared either from (V) with oxygenous acids or from (VI) by acid hydrolysis, hence it may also be obtained directly from (IV) by prolonged treatment with e. g. warm aqueous sulfuric acid etc., eventually diluents being added. Treatment of (IV) with organic acids leads to diacyl derivatives with identical or different acyl residues; analogous derivatives can be obtained from VI, VII and VIII by acylation.

By treatment of (IV) with a hydrogen halide the corresponding halogen ketone (IX) with a protected hydroxyl group are obtained. If this hydroxyl group had been acylated or alkoxylated with alkyls which can easily be eliminated by the oxy-halogen ketone (X) can be prepared from (IX) by acid hydrolysis. This oxy-halogen ketone (X) is easily obtained from (V) with a hydrogen halide.

The reactions mentioned can with the exception of the alkaline hydrolysis also be carried out after preceding saturation of the double bond e. g. with bromine. All of them can be carried out in the presence of diluents.

Analogous reactions may be carried out starting e. g. with the well-known 3-oxy-aetio-allocholanic acid (Dalmer, Werder, Honigmann, Heyns, Ber. 68, 1814, 1936) and with other substituted derivatives of the aetio-cholanic or cholenic acids series carrying further substituents in the ring system besides those at the carbon atom $C_3$ especially oxygen as a hydroxyl group or in ether- or oxide-like bounds.

Most of the derivatives of pregnanolone substituted in the carbon atom $C_{21}$ are well crystallized compounds. If the substituent at the carbon atom $C_{21}$ is a halogen, a hydroxyl or an acyloxyl group the substances are very sensitive to alkalies and rapidly reduce an ammoniacal silver solution at ordinary temperatures.

If the free acid is used first the hydroxyl group is protected e. g. by acylation or alkoxylation; then the acid is converted into the acid halide (Formula III). Upon reaction of the latter with diazo-methane either the 21-diazo-ketone (IV) or the 21-halogen-ketone (IX) is obtained depending on whether from the beginning an ex-

EXAMPLES

For the sake of simplicity the examples will concern the case mentioned above.

1. *Production of diazo ketones*

The 3-oxy-aetio-cholenic acid or its derivatives acylated or alkoxylated in the hydroxyl group used as a starting material can be obtained by oxydative decomposition of 3-oxy-bisnor-cholenic acid (Fernholz, Liebigs, Ann. 507, 128, 1933) by way of a number of intermediate products. The free oxy-acid forms colourless crystals melting with decomposition at 280-288° C. (corrected) differences being observed at different velocities of heating. Its methylester forms needles from benzene melting at 180° C. (corrected). The acylated acid melts at 240-252° C. (corrected), its methyl-ester at 153-154° C. (corrected).

One g. of 3-acetoxy-aetio-cholenic acid is boiled with reflux for 3 hours with 5 ml. of benzene and 5 g. of very pure thionyl chloride. Then the mixture is evaporated, humidity being excluded, upon which the acid chloride soon crystallizes. The weakly yellow product does not show a distinct melting point but decomposes at different temperatures depending on the velocity of heating. Sometimes melting at 160° C. may be observed followed by resolidifying and eventually melting again of the decomposed mass at a temperature over 300° C. The chloride is dissolved in 80 ml. of dry ether and poured into a dry ethereal solution of 1-1.5 g. of diazomethane, the temperature being —10° C.

The mixture is left to stand for some hours at 0° C., then for 6 hours at room temperature after which it is concentrated. Petroleumether is added until a turbidity occurs. The diazo ketone crystallizes. From the motherliquor additional amounts are obtained in analogous ways. Yield 0.7 g. of a pure product, weakly, pale yellow leaflets, melting point approaching 150° C. somewhat different depending on the velocity of heating.

For the preparation of the free diazo-21-pregnene-5-ol-3-one-20, one g. of the above acetate is suspended in 30 ml. of methanol, 16 ml. of a 5% solution of potassium hydroxide in methanol are added and the mixture is left to stand at room temperature for 6 hours with occasional agitation. The crystals dissolve after about half an hour. Then some water is added and after concentration in vacuo the oxy-diazo ketone crystallizes. It is filtered with suction washed with water and dried in vacuo; it can be recrystallized from ether-petroleumether, it then being obtained in pale yellow lustrous grains melting at 144° C. with vigorous decomposition; upon slow heating the melting point can be found lower. The yield is almost quantitative. The product is distinguished from the acylated diazo ketone by its being precipitated by digitonine from a 80-90% alcoholic solution.

2. Production of the halogen ketones 0.2 gramme of the acetate of diazo-21-pregnene-5-ol-3-one-20 are suspended or dissolved in ether and an ethereal solution of dry hydrochloric acid is added until the stormy development of gas has finished. Then the ether and the excessive hydrochloric acid are evaporated in vacuo and the residue is recrystallized from ether upon addition of pentane and subsequently from methanol; the acetate of chloro-21-pregnene-5-ol-3-one-20 is obtained in colourless needles with melting point 157-158° C. (corrected); its composition is $C_{23}H_{33}O_3Cl$.

The same compound is obtained if at room temperature a solution of diazomethane is added drop by drop to an agitated solution of acetoxy-aetiocholenic acid chloride.

0.1 g. of the acetylated chloro-ketone is boiled with reflux for one hour with 2 ml. ethanol and 0.15 ml. concentrated aqueous hydrochloric acid, the mixture is concentrated in vacuo and the residue is recrystallized from ether-petroleum-ether or from a small quantity of ethanol. From the latter the chloro-21-pregnene-5-ol-3-one-20 is obtained as colourless needles melting at 162-164° C. The same chloro-ketone is obtained upon treatment of the diazo-21-pregnene-5-ol-3-one-20 (Example 1) with hydrochloric acid. The compound is precipitated with digitonine and is so distinguished from its acetylation product. An ammoniacal silver solution is rapidly blackened at room temperature by both chloro-ketones.

3. Production of oxy-ketones with a free hydroxyl group in the side chain 0.15 gramme of acetoxy-diazo ketone (Example 1) are dissolved in 2 ml. of dioxane; upon addition of 1.5 ml. of 2 N sulfuric acid a production of gas begins which is completed by heating to about 40° C. The mixture is diluted with water and extracted with ether; the ethereal solution is washed with a solution of sodium-carbonate, dried and evaporated to dryness in vacuo. For further purification the product can be sublimated in vacuo and recrystallized from ether by concentration. In this way the pregnene-5-diol-3,21-one-20-acetate-3 is obtained in colourless crystals which show a correct composition ($C_{23}H_{34}O_4$) yet generally do not melt very sharply at about 150-155°. Evidently they easily attract water; the compound strongly reduces ammoniacal silver solution and is not precipitated by digitonine.

To produce the free dioxy-ketone 0.1 g. of the above mono-acetate is dissolved in 2 ml. of methanol and boiled with reflux for one hour with 2 ml. of water and 0.15 ml. of concentrated hydrochloric acid. Then the mixture is evaporated to dryness in vacuo, the residue is dissolved in a small quantity of acetone and precipitated by the addition of water, eventually sublimated in a high vacuum and recrystallized from acetone-ether by concentration. The pregnene-5-diol-3,21-one-20 is thus obtained in colourless leaflets which may be clustered together and may contain some solvent, the melting point generally not being very distinct at 155-160° C. (corrected) notwithstanding the correct composition ($C_{21}H_{32}O_3$).

Often a second melting point can be observed. The same compound is obtained from the oxy-diazo ketone (Example 1b) with aqueous sulfuric acid. It reduces an ammoniacal silver solution and is precipitated by digitonine.

4. Production of partially acylated oxy-ketones with a free hydroxyl group in the ring system (a) 0.2 g. of diazo-21-pregnene-5-ol-3-one-20 (Example 1b) are heated for about 30 minutes at 90° C. with 2 ml. of the purest glacial acetic acid after which the production of gas is finished. After cooling part of the acetoxy ketone crystallizes in beautiful needles. It is suctioned off and washed with ether-pentane. From the motherliquor the residual amount is obtained after evaporation in vacuo. The yield is 0.21 g. The needles contain solvent of crystallization: they become opaque near 80° C. and melt at 180-182° C. (corrected). After effective drying the composition is found to be the calculated one ($C_{23}H_{34}O_4$). The compound is precipitated by digitonine and reduces an ammoniacal silver solution. The same compound can be obtained from the chloro-21-pregnenolone (Example 2b) upon heating with potassium acetate in ethanol or glacial acetic acid or with lead acetate and dioxane; however, this is not advantageous.

(b) 0.1 g. of diazo-21-pregnene-5-ol-3-one-20 is dissolved in 0.5 ml. of dry dioxane by gentle heating and after addition of 0.25 g. of benzoic acid gradually further heated to 110–120° C. until the end of the evolution of gas, which takes about 25 minutes.

The further treatment consists of dissolution in ether washing with sodium-carbonate solution and water drying and evaporating in vacuo. The residue crystallizes from methanol and is obtained by dissolving in acetone-methanol and subsequent concentration in spherical aggregates, which first melt unsharply near 140° C., then soon solidify to lustrous grains to melt again at 171–175° C. The composition corresponds to the pregnene-5-diol-3,21-one-20-benzoate-21.

5. *Derivatives partially alkoxylated in the side chain*

0.1 g. of pregnene-5-diol-3,21-one-20-acetate-3 (Example 3a) is dissolved in 0.25 ml. of pyridine and to it is added at 0° C. a solution of 75 mg. of triphenyl-methyl chloride in 0.25 ml. of benzene. The mixture is left to stand first one hour at 0° C. and subsequently two days at room temperature. Then it is poured into an aqueous solution of sodium-carbonate and shaken with ether. The ethereal solution is washed with water, dried and concentrated, residual pyridine being eliminated in vacuo by gentle heating. The residual trityl compound, a thick syrup containing a little triphenylcarbinol, can be treated further in this form.

To saponify the acetoxy-group it is dissolved in methanol and upon addition of an excess of potassium hydroxide in methanol the mixture is left to stand at room temperature for several hours. Then water is added followed by extraction with ether and washing, drying, and evaporating the ethereal solution.

The trityl compound with a free hydroxyl group at the carbon atom $C_3$ remains as an almost colourless resin contaminated with a little triphenyl-carbinol. It may however be used for further conversions as well, e. g. oxidation of the hydroxyl group to a keto group (cf. application Serial No. 195,162).

The trityl compound hardly reduces an ammoniacal silver solution in the cold.

The new compounds described and obtainable according to the invention can be used as intermediate products for the synthesis of therapeutics.

What I claim is:

1. A process comprising subjecting cyclopentano-polyhydro-phenanthrene carboxylic acid halides substituted in the nucleus (the substituents belonging to the class consisting of H, halogen, hydroxyl, acyloxyl, alkoxyl) to the action of diazomethane.

2. A process comprising subjecting cyclopentano-polyhydro-phenanthrene carboxylic acid halides, substituted in the nucleus (the substituents belonging to the class consisting of H, halogen, hydroxyl, acyloxyl, alkoxyl) to the action of diazomethane after protecting double bonds in the nucleus.

3. A process in which cyclopentano-polyhydro-phenanthrene derivatives, having a side chain at carbon atom 17 of the structure —CO—CHN$_2$ and a nucleus bearing substituents from the class consisting of H, halogen, hydroxyl, acyloxyl, alkoxyl, are subjected to the action of oxygenous acids.

4. A process in which cyclopentano-polyhydro-phenanthrene derivatives, having a side chain at carbon atom 17 of the structure —CO—CHN$_2$ and a nucleus bearing substituents from the class consisting of H, halogen, hydroxyl, acyloxyl, alkoxyl, and are subjected to the action of hydrohalogenic acids.

5. A process comprising converting cyclopentano-polyhydro-phenanthrene carboxylic acids-17 substituted in the nucleus by substituents from the class consisting of H, halogen, hydroxyl, acyloxyl, alkoxyl, into their corresponding acid halides after free hydroxyls in the nucleus are converted into groups which on hydrolysis are reconvertible into the free hydroxyls, subjecting the so obtained acid halides to the action of diazomethane, whereupon the diazo derivative is subjected to the action of acids.

6. A process as claimed in claim 5, in which hydroxy-3-aetio-cholenic acid is used as a starting material.

7. A process in which a cyclopentano-polyhydro-phenanthrene derivative having at least one acylated hydroxyl group in the nucleus and a side chain at carbon atom $C_{17}$ of the structure —CO—CHN$_2$ is subjected to an alkaline hydrolysis and subsequently to the action of organic acids at temperatures of 40–120° C.

8. A process in which cyclopentano-polyhydro-phenanthrene derivatives having at least one acylated hydroxyl group in the nucleus and a side chain at carbon atom $C_{17}$ of the structure —CO—CH$_2$OH are submitted to the action of alkoxylating agents as to obtain the 21 alkoxyl derivative and submitting this product to an alkaline hydrolysis as to set free the hydroxyl groups in the nucleus.

9. As a new compound chloro-21-pregnene-5-ol-3-one-20, having the formula $C_{21}H_{31}O_2Cl$ and the structure:

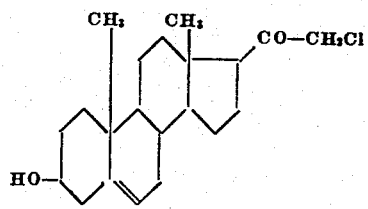

this compound melts at 162–164° C. (corrected) and is precipitated from its solution with digitonine it reduces an ammoniacal silver solution; and it forms colourless needles, soluble in ether, recrystallizable from aethanol or ether-petroleumether.

10. As a new compound pregnene-5-diol-3,21-one-20-triphenyl-methylether-21, having the formula $C_{48}H_{46}O_3$ and the structure:

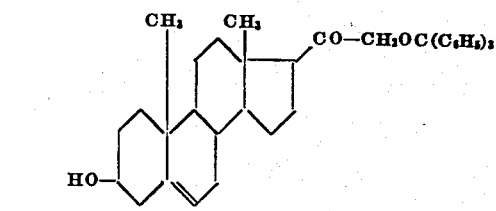

being a colourless resin and hardly reducing an ammoniacal silver solution.

11. As a new compound pregnene-5-diol-3,21- one-20-acetate-21 having the formula $C_{23}H_{34}O_4$ and the structure:

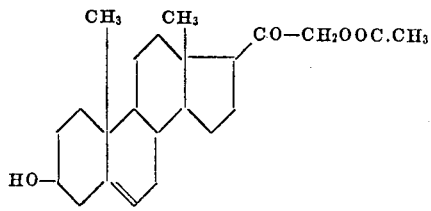

crystals of which become opaque at 80° C. and melt at 180–182° C. (corrected); crystallized from glacial acetic acid the compound forms needles; and a solution of the compound forms a precipitate with digitonine and reduces an ammoniacal silver solution.

12. A process in which substituted cyclopentano-polyhydro-phenanthrene compounds, having a side chain at carbon atom 17 of the structure —CO—CHN₂ and a nucleus bearing substituents from the class consisting of hydrogen, halogen, hydroxyl, acyloxyl and, alkoxyl are subjected to the action of reagents from the class consisting of oxygenous acids and halogenic acids.

13. A process in which substituted cyclopentano-polyhydro-phenanthrene compounds, having a side chain at carbon atom 17 of the structure —CO—CH₂Hlg and a nucleus bearing substituents from the class consisting of hydrogen, halogen, hydroxyl, acyloxyl, and alkoxyl, are treated to substitute halogen by the group —OR in which R represents a radical from the group consisting of hydrogen, acyl and alkyl.

14. A cyclopentano-dimethyl-polyhydro-phenanthrene compound having a hydroxyl group at the 3-position, keto oxygen at the 20-position, and a substituent selected from the group consisting of halogen, aralkoxyl and acyloxyl at the 21-position.

TADEUS REICHSTEIN.